(No Model.)
J. B. SCHMITT.
TRAP.
No. 580,605. Patented Apr. 13, 1897.
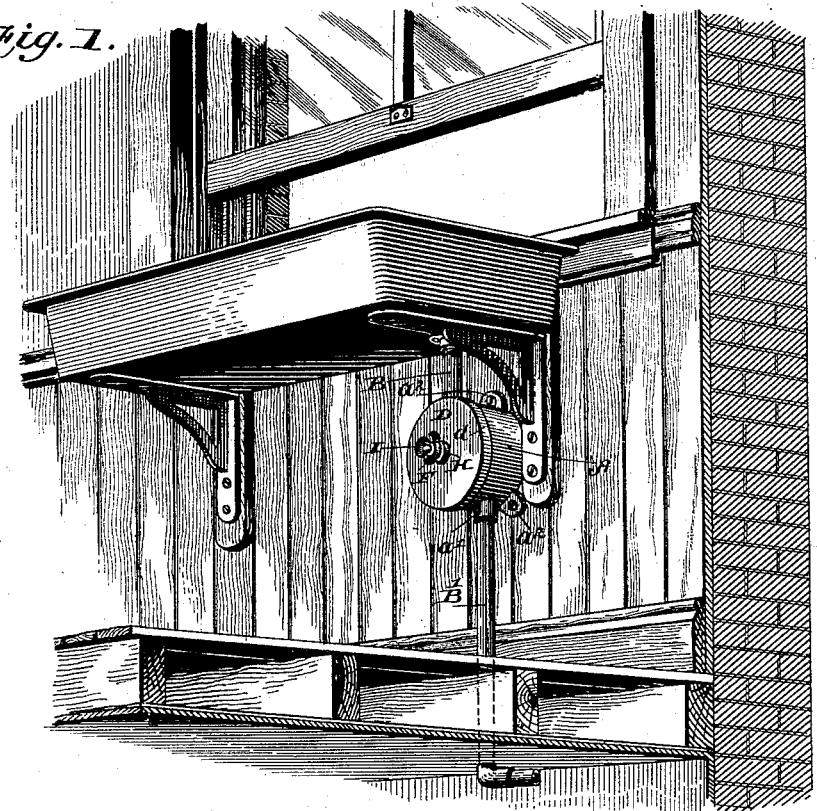
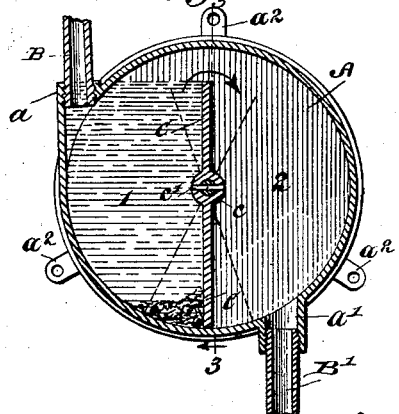
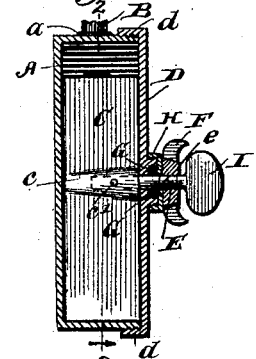
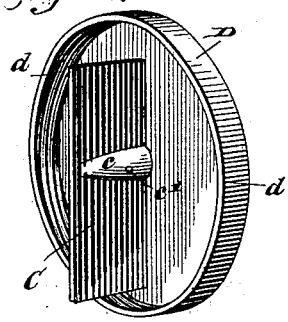
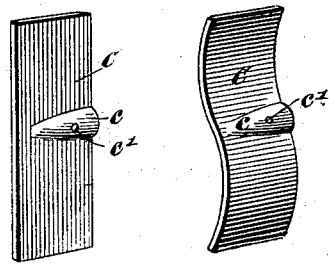
WITNESSES:
H. G. Dieterich,
Chas. E. Brock
INVENTOR
John B. Schmitt.
BY
O'Meara & Co
ATTORNEYS.

UNITED STATES PATENT OFFICE.

JOHN B. SCHMITT, OF PITTSBURG, PENNSYLVANIA.

TRAP.

SPECIFICATION forming part of Letters Patent No. 580,605, dated April 13, 1897.

Application filed March 11, 1896. Serial No. 582,798. (No model.)

*To all whom it may concern:*

Be it known that I, JOHN B. SCHMITT, residing at Pittsburg, in the county of Allegheny and State of Pennsylvania, have invented a new and Improved Trap, of which the following is a specification.

This invention is an improved trap adapted to be connected with the drain-pipe of the ordinary kitchen-sink, but it will of course be understood that this trap can be used in connection with any other drain-pipe.

The object of this invention is to provide a water seal or trap which will do away with the ordinary gooseneck-pipe now in common use. Another object is to provide a trap which will occupy very little room, can be securely attached to the wall, and one in which the separating diaphragm or plate can be regulated as desired to raise or lower the level of the seal.

Another object of the invention is to provide a trap which shall consist of a very few parts, all of which are simple in construction and easily assembled and taken apart, and a still further object is to provide a trap in which the cover can be removed and all the sediment removed whenever desired without disconnecting any of the pipes.

With these objects in view my invention consists, essentially, in a cylindrical-shaped receptacle provided with inlet and outlet connections and an adjustable diaphragm or partition for regulating the level of the seal; and the invention consists also in providing the body of the trap with a removable cover, which cover carries the adjustable diaphragm or partition.

The invention consists also in certain details of construction and novelties of combination, all of which will be fully described hereinafter and pointed out in the claims.

In the drawings forming a part of this specification, Figure 1 is a perspective view showing my invention as applied and used. Fig. 2 is a longitudinal section taken on the line 2 2 of Fig. 3. Fig. 3 is a transverse section taken on the line 3 3 of Fig. 2. Fig. 4 is a detail view of the cover carrying the diaphragm or partition. Fig. 5 is a detail view of said diaphragm or partition, and Fig. 6 shows a slightly-modified form.

In carrying out my invention I employ a cylindrical-shaped body or case A, having couplings $a$ and $a'$, to which the inlet and outlet pipes B and B', respectively, are attached, it being understood that the pipe B is the drain-pipe of the kitchen-sink and the pipe B' leads down to the sewer or other connections. The body or case A is preferably constructed with ears or lugs $a^2$, by means of which the trap is attached to the wall or wainscoting. Within the body or case is arranged a diaphragm or partition C, the lower end of which contacts with the side of the case, as most clearly shown in Figs. 2 and 3, but the upper end does not extend to the opposite side of the case, thereby allowing the water to accumulate upon one side of the case and discharge to the opposite side only after a predetermined level has been reached. This provides a suitable seal to prevent the escape of sewer-gas.

The body or case is preferably constructed with a removable cap or cover D, which is connected by means of the usual screw-joint, as shown at $d$, and in practice I prefer to connect the diaphragm or partition to the removable cover, such object being accomplished by means of a bolt E, which passes through the center of the cover and is secured in a socket $c$, formed upon the diaphragm by means of a pin $c'$, passing through said socket and bolt. The outer end of said bolt is threaded, as shown at $e$, and upon said threaded portion is arranged a winged nut F, by means of which the bolt, diaphragm, and cover are securely locked together, the said bolt being surrounded by a suitable packing-ring G, held in place by a cap H to provide a perfectly-tight joint. The bolt is also provided with a suitable head I, by means of which the diaphragm can be adjusted, it of course being understood that the thumb-nut is first released in order to permit such adjustment. The purpose of adjusting the inclination of the diaphragm is to raise or lower the level of the water seal, and, furthermore, the capacity of the sealing-chamber can be increased or decreased, as most clearly shown in dotted lines in Fig. 2.

Should it be desired, the diaphragm can be made in the form of a compound curve, as most clearly shown in Fig. 6.

Now in operation the trap is quickly and easily attached to the pipes B and B' and secured to the wall or wainscoting. The diaphragm is adjusted at the desired angle and the top or cover screwed upon the body or case. The water will pass into the compartment 1 and accumulate therein until the top of the partition or diaphragm is reached. The water will then flow over into compartment 2 and out through the discharge-pipe. Should it be desired to regulate the diaphragm, it can be accomplished without removing the cover by merely releasing the winged nut and turning the bolt the desired amount.

Should it be desired to clean the trap out at any time, it can be easily accomplished by simply unscrewing the cover and removing the sediment.

It will thus be seen that I provide an exceedingly cheap and simple form of trap, one which will take up very little space below the sink, one in which the level of the seal can be regulated as desired, and one which can be quickly and easily cleaned without disconnecting any of the pipes.

Having thus described my invention, what I claim, and desire to secure by Letters Patent, is—

1. An improved trap comprising a cylindrical-shaped body or case provided with inlet and outlet pipe couplings, the adjustable diaphragm or partition and the removable cover all arranged substantially as shown and described.

2. An improved trap comprising a cylindrical-shaped body or case provided with inlet and outlet pipe couplings, the removable cover and the adjustable diaphragm or partition connected with said cover substantially as shown and described.

3. The combination with the cylindrical case having inlet and outlet pipe couplings and integrally-attached lugs, the adjustable diaphragm or partition the removable cover and the bolt for connecting said diaphragm to the cover substantially as shown and described.

4. In a sink-trap the combination with the body or case constructed as described, of the removable cover the adjustable diaphragm or partition having a socket, the adjusting-bolt fitted in said socket, the winged nut for locking said bolt, the packing-ring and cap substantially as shown and described.

JOHN B. SCHMITT.

Witnesses:
C. J. LOCHINGER,
ANDR. SWANKHAUS.